United States Patent [19]
Catalanotti et al.

[11] Patent Number: 5,630,977
[45] Date of Patent: *May 20, 1997

[54] INJECTION MOLDING METHOD AND SYSTEM WITH EXPANDABLE CAVITY ELEMENT

[75] Inventors: Paul Catalanotti, West Newton; Sassan Tarahomi, North Chelmsford, both of Mass.

[73] Assignee: Roehr Tool Corporation, Hudson, Mass.

[*] Notice: The term of this patent shall not extend beyond the expiration date of Pat. No. 5,387,389.

[21] Appl. No.: 543,986

[22] Filed: Oct. 17, 1995

Related U.S. Application Data

[63] Continuation of Ser. No. 383,818, Feb. 6, 1995, abandoned, which is a continuation of Ser. No. 172,856, Dec. 23, 1993, Pat. No. 5,387,389.

[51] Int. Cl.[6] .................................................. B29C 45/44
[52] U.S. Cl. ...................... 264/318; 249/59; 264/328.1; 264/334; 425/440; 425/441; 425/556; 425/577; 425/DIG. 58
[58] Field of Search .................................. 264/318, 328.1, 264/334; 249/59, 162, 164; 425/556, 577, 438, 441, DIG. 58, 440, 443

[56] References Cited

U.S. PATENT DOCUMENTS

| | | |
|---|---|---|
| 1,421,601 | 7/1922 | Speck . |
| 1,642,947 | 9/1927 | Fischer ............................. 425/442 |
| 4,456,214 | 6/1984 | Ruck et al. ......................... 249/59 |
| 4,643,658 | 2/1987 | Gordon ............................. 425/445 |
| 4,919,608 | 4/1990 | Catalanotti et al. ................ 425/556 |
| 4,938,679 | 7/1990 | Pietrorazio ........................ 249/59 |
| 4,956,142 | 9/1990 | Mangone, Jr. .................... 264/318 |
| 5,090,888 | 2/1992 | Pfannkuchen .................... 425/577 |
| 5,281,385 | 1/1994 | Julian ............................... 264/318 |
| 5,387,389 | 2/1995 | Catalanotti et al. ............... 264/318 |

FOREIGN PATENT DOCUMENTS 256194  1/1981  Spain .

Primary Examiner—Jill L. Heitbrink
Attorney, Agent, or Firm—Richard P. Crowley

[57] ABSTRACT

An injection molding apparatus method and system for molding a plastic article having inward or outward projections on the exterior surface. The injection mold has a first and second mold part adapted to move between a closed, molding position and an open, article-recovering position and which defines a mold cavity for an article to be molded. The first expandable cavity mold part has a base with an opening therethrough and a plurality of outwardly tapered arms extending from the base to an open end that extends into the mold cavity where it is held in place by a striker plate during the injection molding process. The second inner mandrel mold part has a one and other end adapted to move reciprocally and longitudinally within the base and arms of the expandable cavity element, the top end threaded to form the interior threaded surface of the injection molded article. After injecting a molding plastic material at high pressure and temperature, the inner mandrel is removed from the inside and the striker plate removed from the upper side creating an article-recovering position for recovery of the injection molded article.

25 Claims, 6 Drawing Sheets

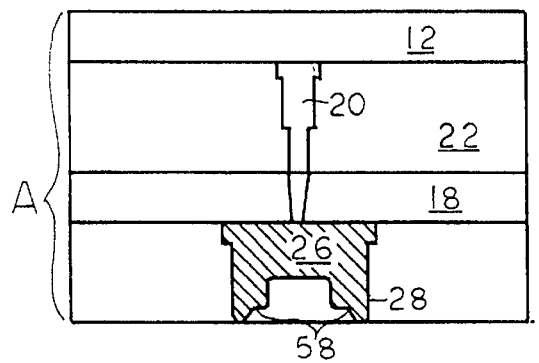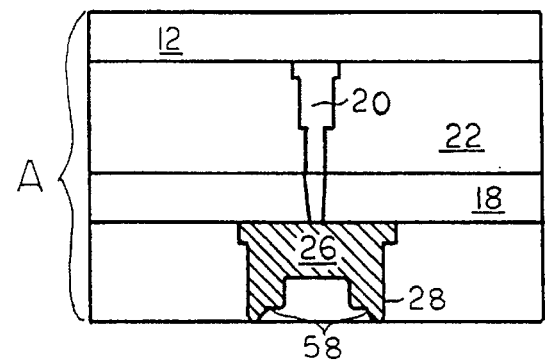
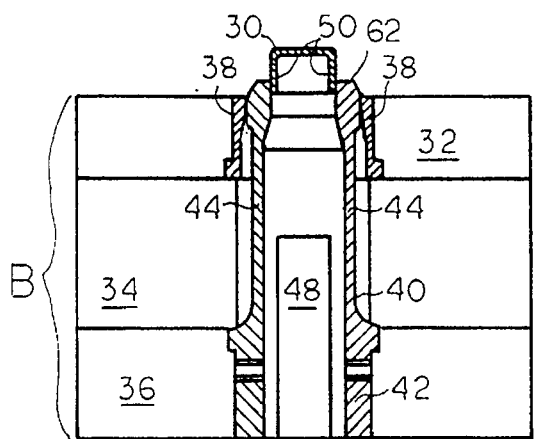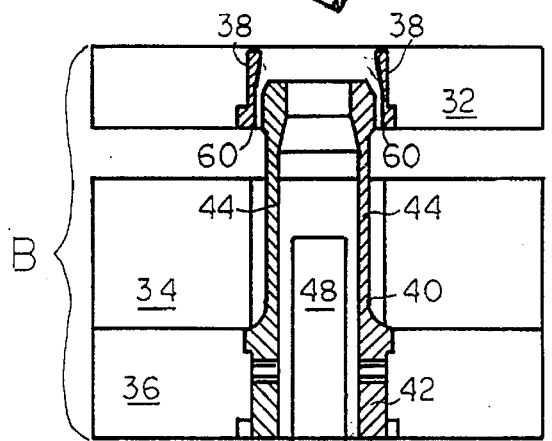
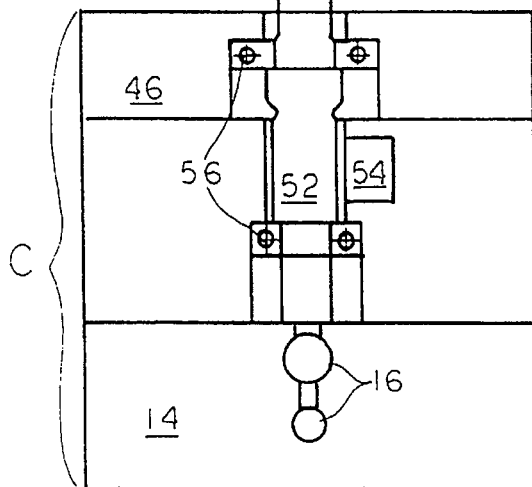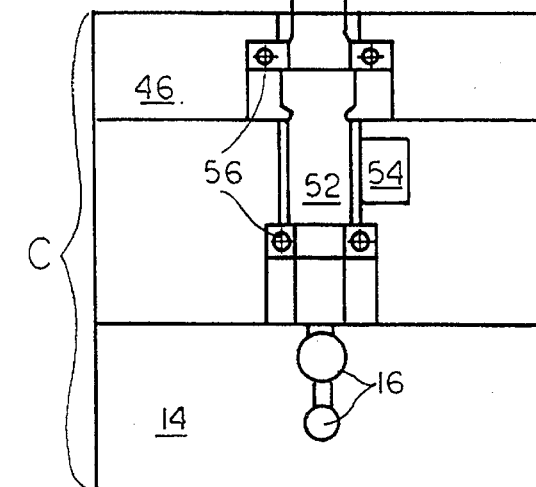
FIG. 5          FIG. 6

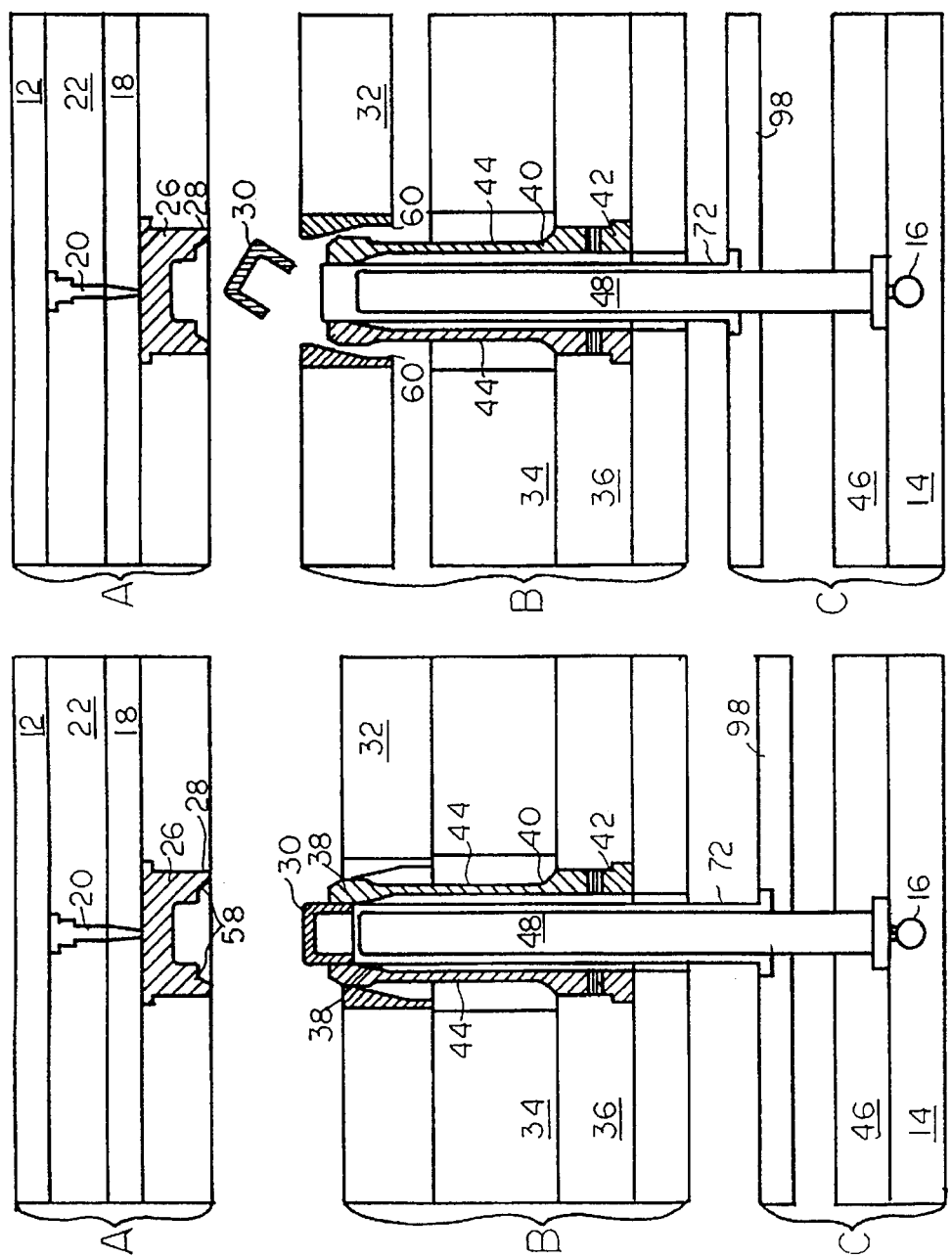

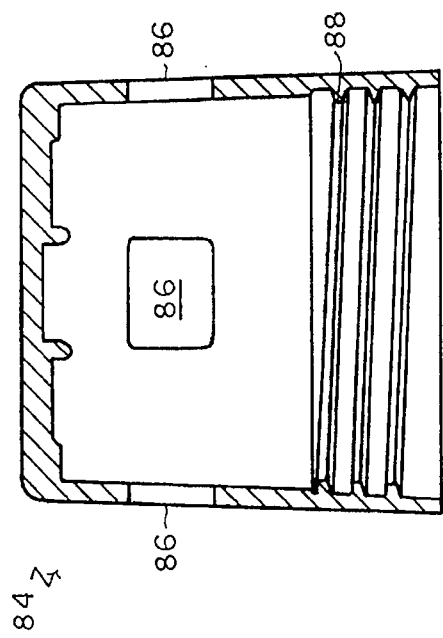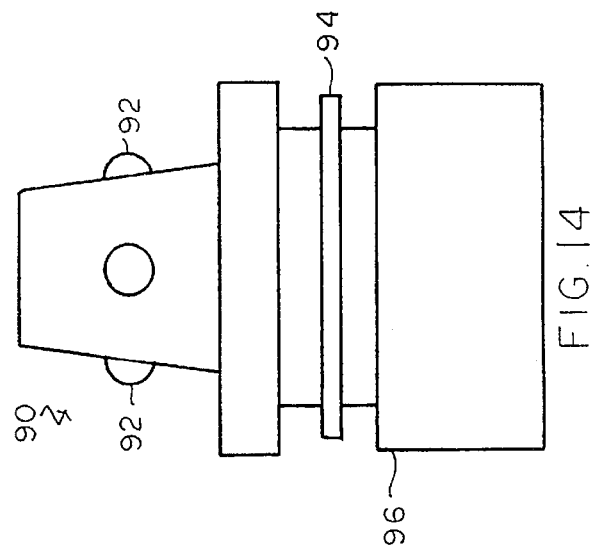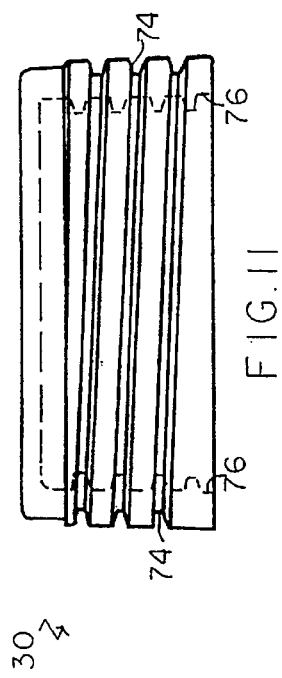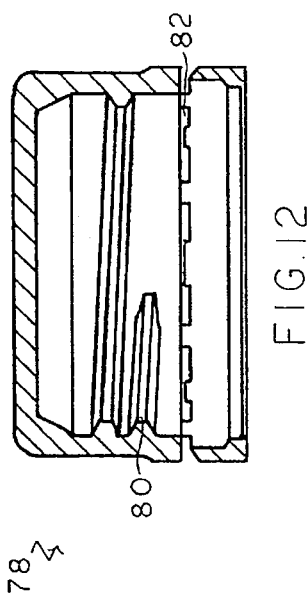

INJECTION MOLDING METHOD AND SYSTEM WITH EXPANDABLE CAVITY ELEMENT

REFERENCE TO PRIOR APPLICATIONS

This application is a continuation application of U.S. Ser. No. 08/383,818, filed Feb. 6, 1995, now abandoned, which is a continuation application of U.S. Ser. No. 08/172,856, filed Dec. 23, 1993, now U.S. Pat. No. 5,387,389, issued Feb. 7, 1995.

DESCRIPTION

Background of the Invention

There are a wide variety of injection molding systems for the molding of plastic parts by the injection of plastic under high pressure and temperature into a mold cavity. Injection molding parts which require internal threads or such protrusions or cut outs or similar defamations in the molded parts often preclude the directed straight line withdrawal of the molded plastic parts from the mold cavity of the injection-molding apparatus. If molded articles such as threaded caps are to be molded, various collapsible cores are employed, so that the core element may be withdrawn and an article with internal threads or undercuts may be easily formed. Injection molding systems employing collapsible cores are described, for example, in U.S. Pat. No. 4,456,214 issued Jun. 26, 1984 and U.S. Pat. No. 4,919,608 issued Apr. 24, 1990.

It is often desirable in injection molding systems to provide for a molded plastic article which has inward or outward projections on the external sides or surfaces of the article and optionally inward or outward projections on the internal surface of the molded object, which internal surfaces may be formed with a mandrel, such as a collapsible core, unscrewing core or straight pull out element. Typically, such molded articles may, for example, be tamper evident-sealed enclosure caps or parts with external threads or any external surface detail that precludes straight pull.

It is therefore desirable to provide for an injection molding system and method employing an expandable cavity element which will provide for the production in an efficient, effective manner of molded articles having inward and/or outward external projections on the external surface, and optionally inward or outward projections or windows on the internal surfaces as desired.

SUMMARY OF THE INVENTION

The invention relates to an injection molding method and system employing an expandable cavity element to provide for the manufacture of molded articles with external inward or outward projections, and optionally also with internal projections and openings in the plastic molded article.

The injection molding system and method of the invention comprises the employment and use of an expandable cavity element typically composed of metal and having a base generally circular and a plurality of generally vertically upwardly extending arms from the base to form at the one end of the cavity element an internal surface which is adapted to surround and to be placed within a mold cavity and to form external inward or outward projections in a molded article. The cavity element in the relaxed, unbiased state has the one end of the arm element extending outwardly and in a non-contacting, slightly spaced-apart, relaxed position, generally with the upper surface of the one end of the cavity element forming a cylinder and having an inwardly tapered surface at the one end to permit the operation of a striker plate and other means to provide for the movement at the one end of the plurality of arms of the cavity element between a relaxed, unbiased, open position wherein the sides of the extending arm elements are not in contact, and a closed molding position wherein the one end of the arm elements are forced together into a closed, contacting position to form external geometry of the molded article within the mold cavity, with the sides of the arm elements in contact in the biased, forced condition where a striker plate is employed in the injection molding system and method. The expandable cavity element should include an inwardly tapered upward surface at the one end to include projections or recesses in the internal surface of the arms at the one end to form the desired molded object in the injection molding system of the invention. The expandable cavity element as employed in the invention may be used alone or in combination with other mandrel-type elements placed within and at the one end of the collapsible core element and within the core cavity, such as a mandrel or collapsible core element to form the internal dimensions of the molded article in the injection molded system.

The injection molding system of the invention is for the injection molding of molded articles such as, but not limited to, a closure cap having exterior and interior threads with or without windows or other projections, and which method comprises providing an injection mold having a first and a second mold part, and the mold part adapted to move between a closed, molding position to form a molding cavity and an open article-recovery position to recover the article, the injection molded method includes an expandable cavity element having a base with an opening therethrough and a plurality of outwardly extended, generally vertically upwardly tapered arms extending from the base, typically a cylindrical base, and about the base opening, and extending to a one end, the arms of this one end extending into the mold cavity in the closed molding position, and having an extended and inwardly tapered surface exterior surface at the one end, and with an internal surface on the one end of the arms having projections or recesses therein, to form the desired recesses or projections on the exterior surface of the molded article. The expandable cavity element employed in this method is adapted to move between an opened, relaxed, unbiased, extended position with the ends of the arm in an open, non-contacting position and a closed end, arm side-contacting, force-retained position within the mold cavity during the molding operation.

Optionally and preferably, the method also includes the employment of a mandrel element, having a one and the other end, such as a collapsible core or screw-type mandrel adapted for reciprocal movement within the mold cavity, generally longitudinally, such as threadable movement within the base and arms of the expandable cavity element. The mandrel element is adapted to move between an extended position wherein the one end forms with the interior surface of the cavity element and the exterior surface of the one end of the mandrel portion of the mold cavity for the formation of the article to be molded and a withdrawn, non-use position wherein the mandrel has been extracted from the mold cavity and the molded article recovered. Thus, where the expandable cavity element and a mandrel are employed in combination within a mold cavity in an injection-molding system, molded articles with exterior and interior surface projections and recesses may be formed. However, it is well recognized that the expandable cavity and the method may be formed without the use of a mandrel and a molded closure cap, for example, or other molded objects formed with having merely windows in the surface and external projections, having no recesses or projections in the internal surface of the article.

The method includes a second mold part having a surface portion of the mold forming the mold cavity tapered inwardly so that in the closed molding position of the mold, the inwardly tapered surface mechanically forces the one end of the plurality of arms of the expandable cavity element into the closed, forced, biased position with the sides of the arms in contact within the molding cavity to form a closed peripheral surface for the formation of the molded part that will include moving the first and second mold parts to a molding position and forcing one open end of the arms of the expandable cavity element in the mold cavity into a closed, force-retained position within the mold cavity by movement of the mold part, typically longitudinal movement against the inwardly-tapered surface of the cavity element and then simultaneously or thereafter placing the one end of the mandrel in an extended position within the cavity element to form the core for the article to be molded. The method includes in a molding position injecting a molding plastic material, typically under high pressure and temperature into the mold cavity so formed between the closed cavity element and the one end of the mandrel to form the molded article in the mold cavity, thereafter moving the second molded part to an open article-recovery position to permit the plurality of arms of the expandable cavity element to move automatically outward to the relaxed biased open position, thereby permitting the withdrawal of the mandrel also, where used, permitting and withdrawing the mandrel to a non-use position, then recovering from an open portion of the mold the article so molded.

In one preferred embodiment, the injection molding method and system includes an expansion limiter sleeve means peripherally positioned about the one end of the said arms of the expandable cavity element and slightly spaced-apart therefrom in the molding position. A method then includes moving the second mold part to permit the arms of the expandable core elements to move just slightly outward, say, for example, less than 0.1 inches, and to rest on the interior surface of the expansion limiter sleeve squeeze means, so as to reduce the pressure on the said arm sufficiently but to have said arms retain a firm hold on the article just formed where a mandrel is used, and includes longitudinally moving the mandrel to a withdrawn position, while the arms of the expandable cavity element retain the molded article in position, thereafter moving the expansion limiter sleeve means to permit the expandable cavity element to permit the arms of the expandable cavity element to move outwardly into the open, relaxed, biased position. Generally, the expansion limiter plate means is placed within the injection mold system, intermediate the first and second mold parts, and is operated by moving the expansion limiter sleeve element longitudinally upward away from the first mold part to release pressure on the said arms of the cavity element and to permit the expandable cavity element to the fully opened, biased position. The molding method is then repeated at the other end of the cavity element, with the mold parts forming a mold cavity, for example, for a cap closure, and then injected with plastic.

In a preferred method of operation of providing a molded part having exterior and interior surface projections or windows employing both an expandable cavity element and an inside mandrel to form the mold cavity, the method includes placing the injection mold in a closed position with the expandable cavity element in a forced, closed molding position and the one end of the mandrel within the other end of the cavity element with the mold parts forming a mold cavity for example, for a cap closure and then with plastic injected into the mold cavity to form the molded article, and includes opening the mold and releasing the pressure on the arm elements of the expandable cavity element lightly by allowing the arm elements to expanded slightly to the interior surface of the expansion limiter sleeve so as to hold the molded plastic part in position while the mandrel is longitudinally removed, such as by threadably removing the mandrel from the molded part into a non-use position. The unscrewing of the mandrel from the molded part takes place and does not wear down the expandable cavity element, as the cavity element is moved out a slight distance and held in place by the expansion limiter sleeve. The method then includes the removal upwardly, typically longitudinally and upwardly, of the expansion limiter sleeve element so that the arms of the expandable cavity element may then move to a natural, relaxed, outwardly-extended, biased position and the molded article may be ejected from the outwardly expanded cavity element in the mold cavity, and thereafter the cycle is repeated.

Optionally and preferably, the system and method may include a positive molded article-ejection or discharge means as part of the molding cycle, to eject affirmatively from the molding cavity the molded article. Where the molded article contains internal threads or projections, the mandrel should be withdrawn or collapsed prior to activation of the article ejection means to avoid stripping of the internal projections, as in the illustrated example, or where there are no internal threads or projections, the mandrel may remain in place.

In one example of a positive article-ejection means, the expansion limiter sleeve means may be used, with the internal upper surface of the sleeve tapered inwardly, so that on upward movement of the sleeve and its associated molded plate in which it is held after the mold is open, the upper surface contacts and positively ejects the molded article from the mold cavity and subsequently returns to its prior position for another molding cycle.

In another example, the mandrel may include a reciprocating, close-fitting, slidable, moveable, outer sleeve, e.g. cylindrical about the mandrel, such as a mandrel which is longitudinally withdrawn, such as by unscrewing, to a withdrawn position or collapsed in place after the molding of the article occurs, and then the mandrel sleeve is reciprocally, longitudinally moved upwardly to eject positively the molded article in the open mold position by the top of the mandrel sleeve forcing the lower end of the article from the mold cavity, and then the mandrel sleeve withdrawn to a lower position for a new molding cycle.

The system and method shall be described for the purposes of illustration only in connection with an injection molding system and method; however, the expandable cavity element may also be effectively used in other article-forming systems, such as, but not limited to: blowing molding of articles, such as plastic containers or olefinic or other thermoplastic polymers, molding the preform parison for blow-molding or in a die casting operation, such as the die casting of metal parts, like zinc.

The invention will be described for the purpose of illustration only in connection with certain embodiments; however, it is recognized that those persons skilled in the art may make various modifications, changes, additions and improvements to the illustrated embodiments without departing from the spirit and scope of the invention.

BRIEF DESCRIPTION OF THE DRAWINGS

FIGS. 3–6 are schematic, illustrative, sectional views of the expandable cavity element in an injection molding system with the system components in different positions during the operation of the molding process.

FIGS. 7–10 are schematic, illustrative sectional views of the expandable cavity element in an injection molding system with a mandrel sleeve as a positive ejection means with the system components in different positions during the operation of the molding process.

FIG. 11 is a side plan view of a tamper-evident cap produced by the injection molding system.

FIG. 12 is a sectional view of another molded closure product of the system.

FIG. 13 is a sectional view of another molded closure product of the system.

FIG. 14 is a side plan view of a molded hose connection product of the system.

DESCRIPTION OF THE EMBODIMENTS

Figure 1:
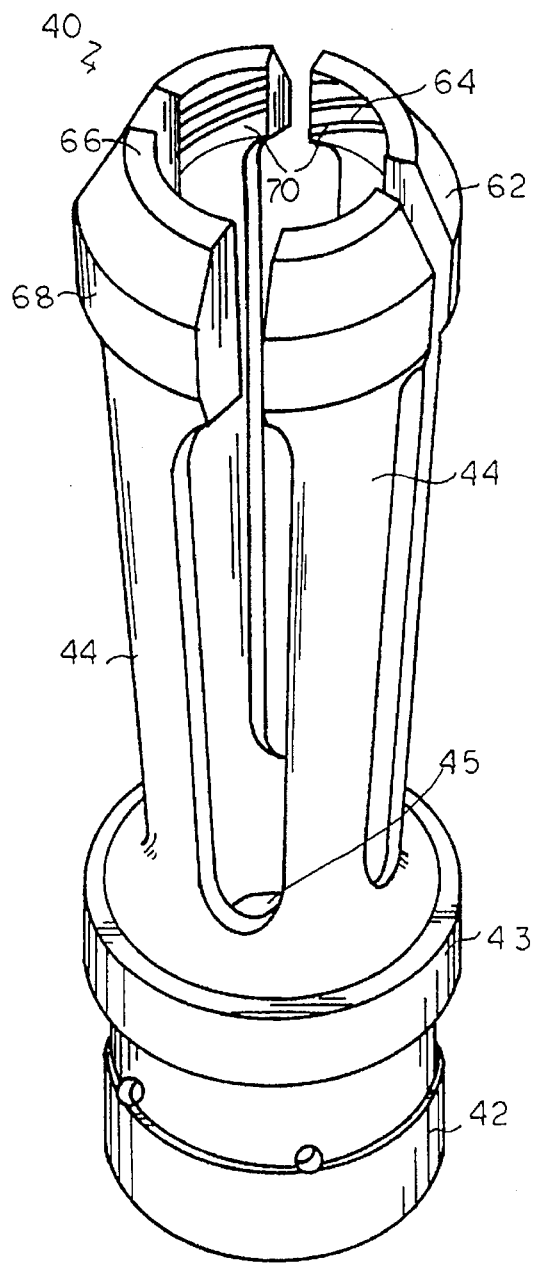
FIG. 1 is a perspective view of the expandable cavity tool of the injection molding system of the invention in an open, relaxed, expanded position.
Figure 2:
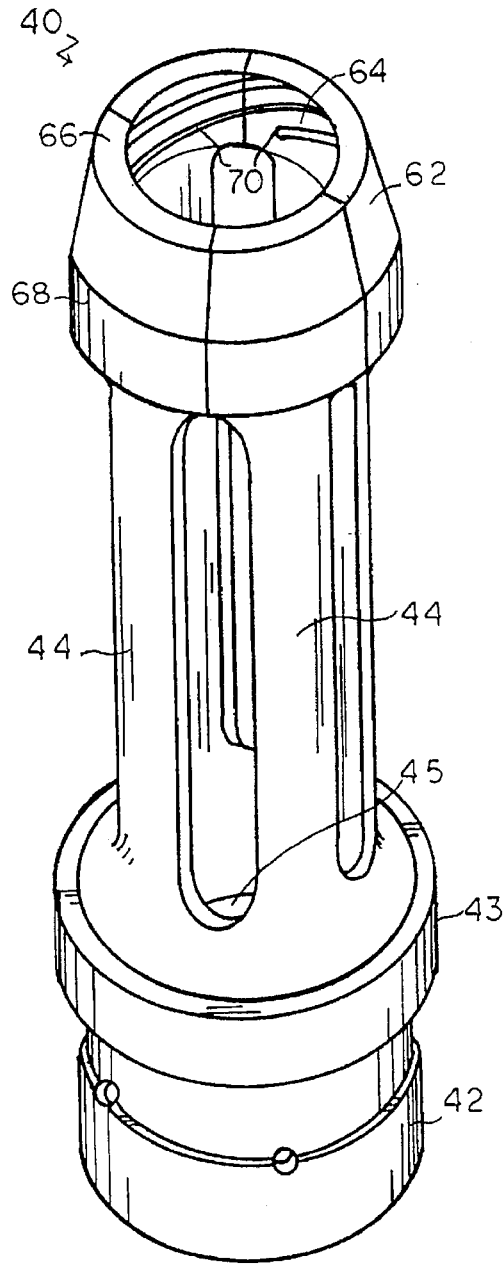
FIG. 2 is a perspective view of the expandable cavity tool of the injection molding system of the invention in a closed, molding position.

With particular reference to FIG. 1 and 2 of the drawings, FIG. 1 is a perspective view of the expandable cavity element or tool used in the described injection molding system and method of the invention 40 in an open, relaxed, expanded non-molding position. The tool 40, formed of a spring steel metal and having a lower base 42 surrounded by cylindrical ridge base 43 and having a plurality of arms 44 as illustrated extending upwardly from the cylindrical ridge 43 to a generally cylindrical outer portion 68 at the one end which has a smoothly tapered surface 62 which extends to a plurality of arcuate pieces 66 which, when forced together into a molding position, (see FIG. 2) form a generally cylindrical opening 45 within the ridge 43 to extend to the one open end, and the inside surface of the open end of the arms 44, the inside surface, represented as 64, includes a plurality of recesses 70 to form outwardly projecting cap threads in the article to be molded. The tool 40 as illustrated in FIG. 1 is in the open, expanded and relaxed position, while in FIG. 2 it is shown in the tension-biased, closed molding position, wherein the sides of the arms 44 have been placed in contact with each other, as it would be within the molding cavity with the arms forced together so the imposition of an exterior surface of the mold part against the tapered surface 62 at the other end of the arms (not illustrated, see FIG. 3–6).

Figure 3:
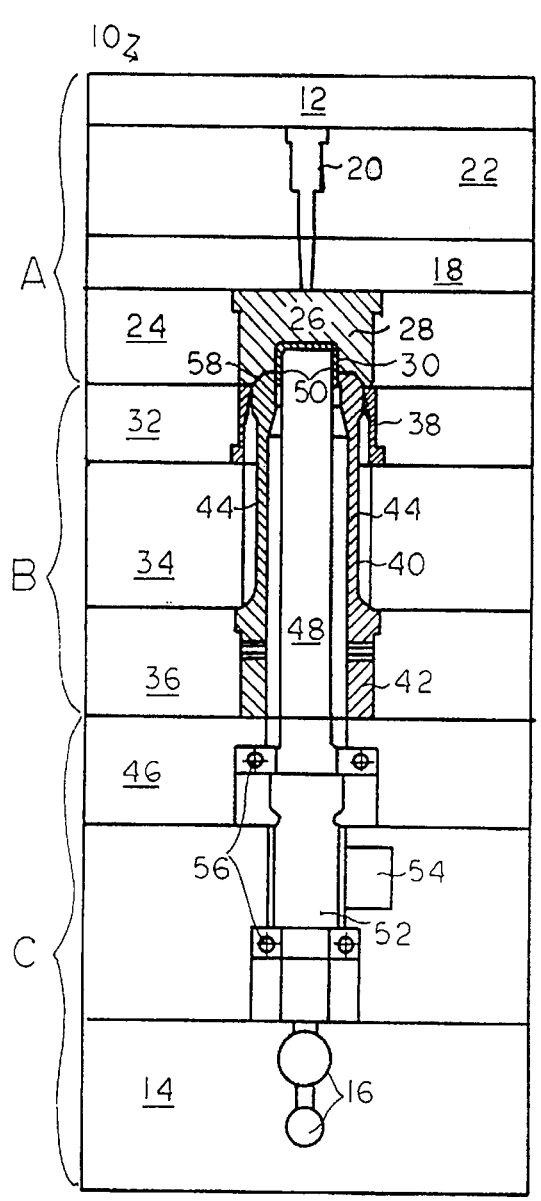
Figure 4:
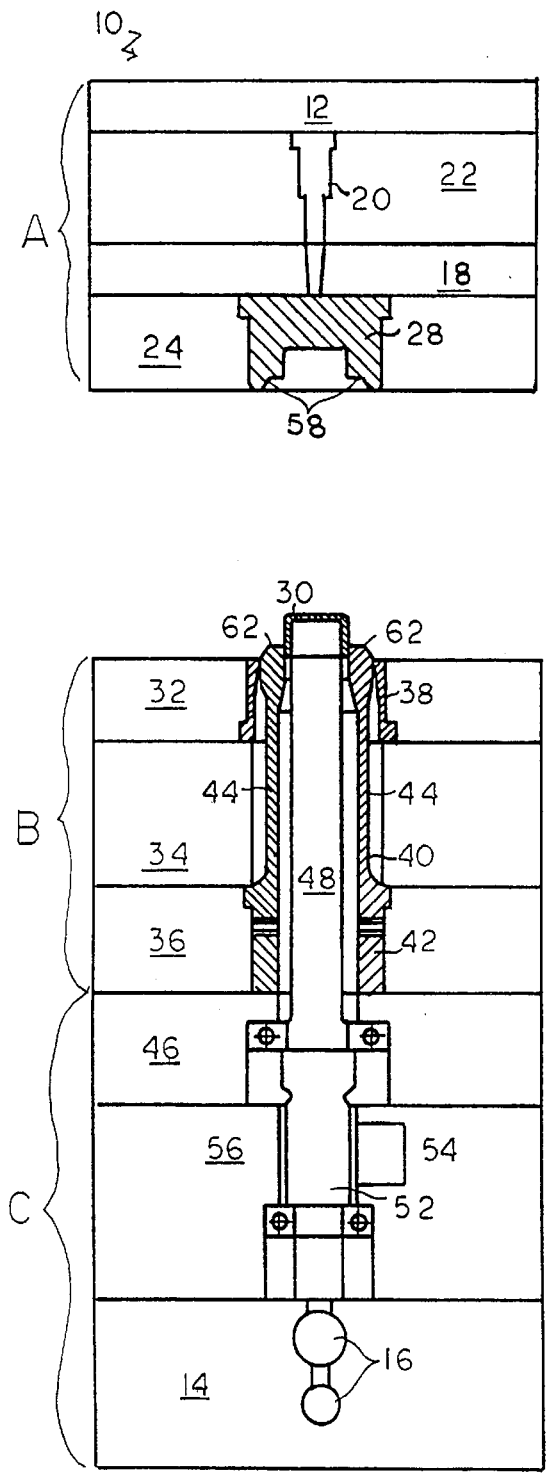

FIGS. 3–6 are schematic, illustrated sectional views of the expandable cavity tool or element of the invention employed in an injection molding system and method, wherein FIG. 3 is a composite mold composed of parts A, B and C joined and illustrates the injection molding system in a molding position, wherein the expandable cavity element 40 has been placed in a tension-biased molding position within the mold cavity. FIG. 4 is directed to the removable part A of the mold with the one end of the core element 40 with the arms positioned against the surfaces of an expansion limiter sleeve to relieve pressure slightly so as to permit a mandrel 48 to be longitudinally unscrewed and moved downwardly. FIG. 5 is a sectional view of the injection mold system and method wherein the internal mandrel has been unscrewed while the article molded part has been held within the one end of the expandable cavity element 40. FIG. 6 is an illustration of the mold parts A, B and C in an open article-recovery position, showing the discharge of said molded article 30 with the parts A, B, and C being longitudinally removed in a reciprocal manner throughout FIGS. 3, 4, 5 and 6.

FIG. 3 illustrates the injection molding system and method of the invention with the expandable cavity element in a molding position with a mold 10 composing sections A, B and C in a molding position and including a backup plate top 12 and backup plate bottom 14 with water cooling holes 16 providing a spruce part plate 18 which defines a plastic material injection molding port 20 within an injection part plate 22. The mold 10 includes a striker cavity plate 24 with a striker cavity insert 26 to define a striker cavity 28. The injection molding system provides for a closure cap 30 illustrated and in the particular injection molding system and method described having both external and internal undercuts, such as a tamper-evident cap for use with packaging.

The mold includes an expansion limiter plate 32 and a support plate 34 in a cavity mounting plate 36 with a cylindrical retaining-ejector sleeve 38 having an inwardly tapered internal surface at its upper end about the expandable cavity element or tool 40, in the base 42 and the arms 44 providing for an unscrewing support plate 46. The mold 10 also includes a screwable type mandrel 48 which may also comprise a collapsible core as desired or a striker pin. The mandrel includes exterior surface threads 50 on the one end of the mandrel in order to form the internal threaded projections on the inside of the molded article cap 30 while the interior surface of the core element includes recesses 70 in order to provide for external projected threads on the molded cap 30. The mold system includes a pinion-gear unscrewing mandrel 52 to unscrew mandrel 48 and includes a rack pinion gear 54 and bearings 56 while insert 26 includes a curved surface which presses against the tapered surface 62 of the core element 40 in order to place the core element 40 into a biased molding position, while the space 60 illustrates the space between the other ends of the arms 44 of the core element 40 in the relaxed, open position. Where a collapsible core is employed as the mandrel element, then the collapsible core need not be moved longitudinally, but may move between an expanded molding position and an inwardly collapsed condition for the receiving of the molded article.

In operation, the mold 10 shows the mold components A, B and C in an injection molding position, with plastic material injected through the port 20 into the mold cavity to form the molded article 30 and with the core element in the closed molding position under tension due to the forcing together of the arms 44 by the surface 58 against the surface 62 with the mandrel 48 extending upwardly to form the inner surface of the molded article 30.

FIG. 4 shows the inside of the mold 10 which has longitudinally withdrawn with the side arm elements 44 of the expandable tool 40 moved slightly outward, say, for example, about 0.05 to 0.1 inches, the movement against the internal surface of the expansion limiter sleeve 38. This movement is sufficient to hold the molded article 30 in position yet sufficient to permit the mandrel 48 or collapsible core to be threadably withdrawn at the one end from the interior of the molded article 30. FIG. 5 illustrates that the mandrel 48 has been completely unscrewed on the molded article 30 held in position by the tension-biased arms 44 of the expandable cavity element 40.

FIG. 6 is directed to the mold of A, B and C in an open, article-discharging position, wherein the striker plate means B, shown also in FIG. 5, moved and the expansion limiter plate moved upwardly to relieve the tension on the outer tapered surface 62 of the arms 44 of the expandable cavity element 40, thereby permitting the expandable cavity element to move to its open, relaxed, non-molding position, and to permit the discharge of the molded article 30 containing projections or windows both on the exterior and interior surfaces. The molding cycle is then repeated as in FIGS. 3–6 by the upward movement of the sleeve 38, which strikes and ejects the molded article from the mold cavity.

FIGS. 7–10 are similar to FIGS. 3–6 except for the employment of a slidable, cylindrical, extended ejector sleeve 72 about the mandrel 48 having a one end secured to a separate, moveable mold plate 98 of part C of the mold and the other end closely about the upper end of the mandrel 48. The use of the ejector sleeve 48 permits positive displacement of the mold article 30 when the mold 10 is in the open position.

Figures 7, 8:
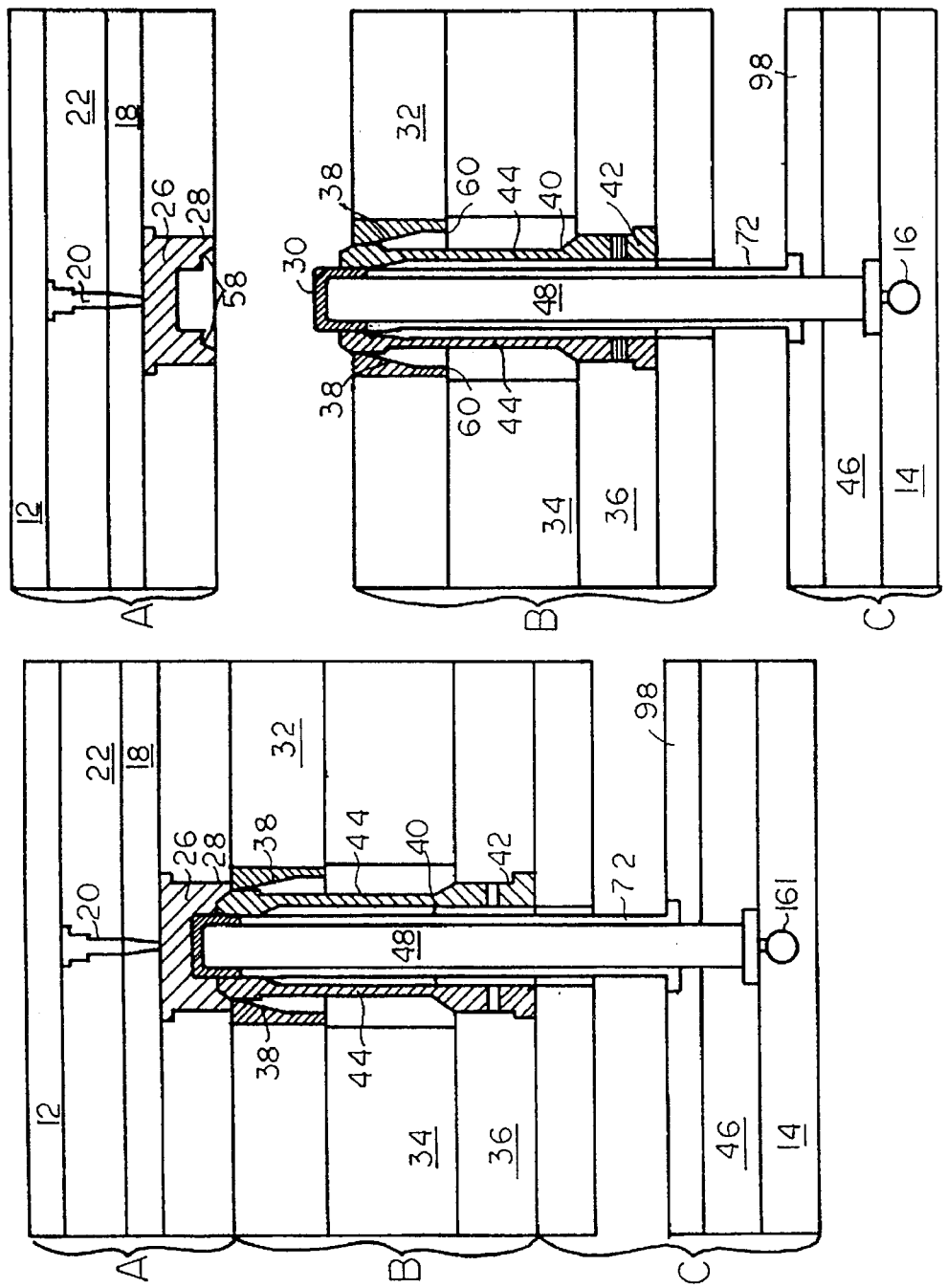

FIG. 7 illustrates the mold in the closed molding position. FIG. 8 shows the mold in an open position after molding of the cap article 30. FIG. 9 shows the mandrel 48 in a retracted position with the one upper end of the mandrel moved downwardly, e.g. unscrewed or slid out of the mold cavity. (The mandrel movement need not occur where a collapsible core is used as the mandrel). The ejector sleeve 72 in mold plate 98 is retained in position.

FIG. 10 shows the upward movement of the mold plate 98 with the ejector sleeve 72, so that the upper end of the ejector sleeve strikes the lower surface of the molded article 30 and positively ejects the article from the mold. The plate 98 and ejector sleeve 72 are then retracted and the mandrel returned to the position in FIG. 7 to repeat the molding operation.

FIG. 11 is an illustrated embodiment of the closure cap 30 molded by the injection molding system of the invention in which the cap 30 comprises external threads 74 formed by the internal surface recesses of the surface 64 of the expandable cavity tool 40 and internal projection threads 76 formed by the one end of the mandrel 48. FIG. 12 is illustrative of a similar or another type of cap 78 containing internal threads 80 and a plurality of windows 82 formed between the lower section of the enclosure cap 78. FIG. 13 is illustrative of a closure cap 84 with one or more peripheral windows 86 and internal threads 88 as a tamper-evident closure cap. FIG. 14 is directed to another illustration of a possible molded part produced by the injection molding system of the invention which includes, for example, a hose clamp 90 having external projections 92, an external ridge 94 and a base 96.

A wide variety of cast or molded parts may be produced by the system and method employing the expandable cavity element of the invention, wherein said parts form external projections or recesses, and optionally with both external and internal projections and recesses as illustrated.

What is claimed is:

1. A method for the molding of a molded article having an exterior surface having an opening therein or projections thereon, which method comprises:
   a) providing a mold having a first mold part and a second mold part, the mold parts adapted to move between a closed molding position and an open position, and which mold defines a mold cavity for an article to be molded, said mold including:
      i) an expandable cavity element, formed of a spring steel metal and having a base with an opening therethrough with a longitudinal axis and a plurality of generally vertically biased arms extending from said base and about said opening, to a first upper open end, said arms at said first upper open end adapted to extend into said mold cavity during the molding method, and having an interior surface, the interior surface to form projections or openings on the exterior surface of the molded article, and having an exterior tapered surface and having a generally arcuate band element having an exterior surface generally parallel to the longitudinal axis and extending downwardly from said tapered surface, said arms of said expandable cavity element adapted to move at said first end between an open unbiased position, with said first upper ends of said arms in an open, non-side-contacting position, and a closed, biased molding position with said first upper ends of said arms in a closed-end, side-contacting position and the arcuate band elements forming a generally cylindrical exterior band surface in a closed molding position; and
      ii) said second mold part having a retaining-ejector sleeve means with a surface so that in the closed, molding position of the mold said sleeve surface mechanically forces said first upper end of said unbiased arms of said expandable cavity element into said closed, biased molding position on movement of said second mold part;
   b) moving said mold parts to a closed molding position and mechanically forcing said first upper open end of said unbiased arms of said cavity element in said mold cavity into the closed, biased molding position within said mold cavity by the movement of said second mold part and retaining-ejector sleeve means against said exterior tapered surface and said exterior surface of the arcuate band element of said unbiased arms;
   c) injecting a molding material into said mold cavity to form a molded article in said mold cavity with an opening in or a projection on said exterior surface of said article;
   d) moving said second mold part to an open article-recovery position to permit said arms of said expandable core element to spring open without the use of mechanical force to the open, unbiased position; and
   e) recovering from the mold in the open position the article so molded.

2. The method of claim 1 which includes providing said expandable cavity element with an interior surface characterized by a plurality of recesses or projections to form projections or openings in the side of the molded article.

3. The method of claim 1 wherein said first mold part includes an expansion limiter sleeve means peripherally positioned about said first upper end of said arms of said expandable cavity element and slightly spaced apart therefrom, and which method includes:
   a) moving said second mold part to permit said arms of said expandable cavity element to move slightly outwardly and said exterior surface of said arcuate band element to rest on said interior surface of said expansion limiter sleeve means, so as to reduce pressure on said arms; but to have said cavity element retain a firm hold on the molded article by said arms for the removal of an internal mandrel; and
   b) moving said expansion limiter sleeve means to permit said arms of said expandable cavity element to move fully outwardly to the open, unbiased position.

4. The method of claim 1 wherein said expandable cavity element is integrally formed of a spring metal, which element has a cylindrical base and a plurality of generally uniformly spaced apart, outwardly, upwardly extended side arms from said cylindrical base, said arms having an inwardly tapered, exterior peripheral frusto-conical surface at said first upper end adjacent and directly above said arcuate band element and an interior surface with recesses or projections thereon, and which arms form a circle at said first upper end in the closed, side-contacting biased position.

5. The method of claim 3 which includes employing an inner mandrel within said opening of said expandable cavity element, which inner mandrel moves between an extended position during a molding injection step and a removed position during the article recovery step.

6. The method of claim 3 which includes moving said arms of said band element outwardly against the interior surface of said expansion limiter sleeve means in an amount of about 0.05 to 0.10 inches.

7. The method of claim 5 wherein said inner mandrel element comprises a threadable inner mandrel element and which method includes unthreading said inner mandrel element from the mold cavity after formation of the molded article and while the molded article is held by said arms in the mold cavity.

8. The method of claim 5 wherein said inner mandrel element comprises an inwardly collapsible core element which forms internal projections or openings within the molded article and which method includes collapsing inwardly the collapsed core element after molding of the molded article to permit recovering the article from the mold.

9. The method of claim 5 which includes an ejector sleeve means about the exterior of said inner mandrel element and which method includes slidably longitudinally moving said ejector sleeve means independent of said inner mandrel element to strike and positively eject the molded article from the mold cavity in the open mold position.

10. The method of claim 5 which includes molding a tamper-proof plastic cap with an exterior projection and internal cap threads.

11. An expandable cavity core element adapted for use in an injection molding system to form a molded article having external surface projections or openings, which expandable core cavity element is integrally formed of a spring steel metal and comprises:

a) a base having a first upper end and a second lower end, said base having a base opening therethrough and having a plurality of upwardly, generally vertically extending, tapered arms extending from said second lower end of said base about a longitudinal axis of said opening, to a first open end, said arms of said first open end adapted to extend into a mold cavity during an injection molding method;

b) said arms of said first upper end characterized by having a tapered exterior surface and an interior surface having an opening or projection thereon to form openings or projections on the exterior surface of the injected, molded article;

c) said arms having a generally arcuate band element having an exterior surface generally parallel to the longitudinal axis of said base opening and extending downwardly from said tapered exterior surface a selected distance to provide an exterior arcuate surface wherein the band elements form a generally cylindrical peripheral exterior surface in a closed molding position; and d) said arms of said expandable cavity element arranged and constructed to move between;
  i) an open, relaxed, biased, non-molding use position in a molding system, and
  ii) a closed, force-retained molding position in a molding system, wherein said arms of said first upper end are held in the molding position by a mechanical force against said exterior tapered surface and said band element.

12. The expandable cavity element of claim 11 wherein said element has from four to eight arms, generally uniformly spaced apart and about the longitudinal axis.

13. The expandable cavity element of claim 11 which includes a plurality of generally equally spaced apart, elongated, upwardly extending arm openings from the base between said arms, with said arm openings on either side of each arm and each end of each arm opening of generally arcuate shape.

14. The expandable cavity element of claim 11 wherein said tapered exterior surface comprises an inwardly tapered, frusto-conical surface which extends upwardly from the top of said band element and to said first upper end of each arm.

15. The expandable cavity element of claim 11 wherein said openings or projections on said interior surface comprise a plurality of recesses to form outwardly extending openings or projections on said exterior surface of the injection molded article.

16. The expandable cavity element of claim 11 wherein said arcuate band element and said tapered surface are both characterized by smooth exterior surfaces whereby a surrounding sleeve element places said first upper ends of said arms in a closed molding position by mechanical force against said tapered surface and said arcuate band element.

17. In combination, the expandable cavity element of claim 11 and an inner mandrel, which inner mandrel is adapted to be positioned within said opening of said expandable cavity element, to form internal projections or openings on the molded article, and said second upper end of said expandable cavity element arranged and constructed to surround said inner mandrel in the molding position.

18. The combination of claim 17 which includes an expansion limiter sleeve means surrounding said band element of said expandable cavity element, which expansion limiter sleeve means limits slightly the outward movement of said arms of said expandable cavity element to provide for the holding of the injection molded article after molding in the mold cavity during the molding method and system, while said internal mandrel is removed from the mold cavity.

19. The combination of claim 18, wherein said expansion limiter sleeve means has an opposite-tapered internal surface to engage said exterior tapered surface of said cavity element, and a parallel internal surface engage said exterior surface of said band element.

20. The combination of claim 17 wherein said internal mandrel comprises a threaded internal mandrel which moves between a molding position and a non-molding position by the threading and the unthreading of said internal mandrel.

21. The combination of claim 17 wherein said internal mandrel comprises an inwardly collapsible core element.

22. An injection molding system to provide an injection-molded article having external surface projections or openings; and which injection molding system comprises in combination:

a) an injection mold having a first mold part and a second mold part, said mold parts adapted to move between a closed molding position and an open, article recovering position, and which mold defines a mold cavity for an article to be molded;

b) an expandable cavity element of a spring steel metal and having a base with an opening therethrough with a longitudinal axis, and a plurality of generally vertical arms extending from said base and about said opening to a first upper open end, said arms at said first upper end extending into said mold cavity and having at said first upper end an exterior tapered surface and having an interior surface to form a projection or opening on said exterior surface of the article to be molded, and having a generally cylindrical band element having an exterior surface generally parallel to the longitudinal axis and extending downwardly from said tapered surface, said arms of said expandable cavity element adapted to move at said first upper end between an open unbiased position with said ends of said arms in an open, non-side-contacting position, and a closed, biased molding position with said ends of said arms in a closed-end, side-contacting position;

c) said second mold part having a sleeve means having a surface portion tapered, so that in said closed, molding position of said mold said tapered surface mechanically forces said one end of said arms of said expandable cavity element into the closed, biased position on movement of said second mold part;

d) means to inject a molded plastic material into the mold cavity to form a molded article; and e) means to move said first and second mold parts between a closed and open mold position whereby said second mold part is moved to a closed, molding position forcing said first upper open end of said arms of said expandable cavity element in the mold cavity into a closed, biased, molding position during the molding process and said second mold part moving to the article recovery position, permitting said arms of said expandable cavity element to spring without mechanical means into the open unbiased position.

23. The system of claim 22 which includes an expansion limiter sleeve means peripherally positioned about said first upper end of said arms of said expandable cavity element and spaced slightly apart therefrom, to permit said band element of said arms of said expandable cavity element to move slightly outwardly against an interior surface of said expansion limiter means after the injection molding of the article, to hold firmly the formed molded article, and thereafter to have said expansion limiter sleeve means move so that said arms of said expandable cavity element may move to the relaxed, open position.

24. The system of claim 23 which includes a threadable inner mandrel element within said opening of said expandable cavity element and having an upper end in the mold cavity to form projections or openings on the interior surface of the molded article, said threadable inner mandrel reciprocally and threadably moving between open and closed mold cavity positions.

25. The system of claim 24 which includes an ejector sleeve means about said inner mandrel to eject the molded article from the open mold cavity by slidable movement of said ejector sleeve means independent of said inner mandrel element.

* * * * *

UNITED STATES PATENT AND TRADEMARK OFFICE
CERTIFICATE OF CORRECTION

PATENT NO. : 5,630,977
DATED : May 20, 1997
INVENTOR(S) : Paul Catalanotti et al It is certified that error appears in the above-indentified patent and that said Letters Patent is hereby corrected as shown below:

Column 10, line 49, delete "an opposite-" and insert --a--.

Signed and Sealed this

Thirtieth Day of December, 1997

Attest:

BRUCE LEHMAN

*Attesting Officer*        *Commissioner of Patents and Trademarks*